United States Patent
Deile et al.

(10) Patent No.: US 7,019,902 B2
(45) Date of Patent: Mar. 28, 2006

(54) BEAM FORMING TELESCOPE WITH POLARIZATION CORRECTION

(75) Inventors: Jochen Deile, West Hartford, CT (US); Joachim Schulz, Stuttgart (DE)

(73) Assignee: Trumpf Inc., Farmington, CT (US)

( * ) Notice: Subject to any disclaimer, the term of this patent is extended or adjusted under 35 U.S.C. 154(b) by 0 days.

(21) Appl. No.: 10/274,860

(22) Filed: Oct. 21, 2002

(65) Prior Publication Data
US 2004/0075901 A1 Apr. 22, 2004

(51) Int. Cl.
*G02B 27/28* (2006.01)
*G02B 5/30* (2006.01)

(52) U.S. Cl. ............... 359/487; 359/485; 372/106

(58) Field of Classification Search ........... 359/370, 359/485, 487, 559, 584; 372/106, 27; 250/216, 250/237 R
See application file for complete search history.

(56) References Cited

U.S. PATENT DOCUMENTS

| | | |
|---|---|---|
| 3,484,713 A | 12/1969 | Fenner |
| 3,527,520 A | 9/1970 | Harres |
| 3,617,934 A | 11/1971 | Segre |
| 3,777,280 A | 12/1973 | Pohl |
| 4,084,883 A | 4/1978 | Eastman et al. |
| 4,147,409 A | 4/1979 | Apfel |
| 4,309,075 A | 1/1982 | Apfel et al. |
| 4,312,570 A | 1/1982 | Southwell |
| 4,531,216 A | 7/1985 | Tyler |
| 4,609,258 A | 9/1986 | Adachi et al. |
| 5,291,012 A * | 3/1994 | Shimizu et al. ............ 250/216 |
| 5,375,130 A | 12/1994 | Shih |
| 5,847,872 A | 12/1998 | Ito |

FOREIGN PATENT DOCUMENTS

| | | |
|---|---|---|
| DE | 44 21 600 A1 | 1/1996 |
| EP | 0 911 922 A1 | 4/1999 |
| WO | WO 96/42128 | * 12/1996 |

OTHER PUBLICATIONS

II-VI INCORPORATED, Coating Design Code ATFR Absorbing Thin Film Reflector, Revised May 1997.
Gary Herrit et al, "Mirror Measures Laser's polarization", Nov. 2000 Industrial Laser Solutions, Technology Review.

* cited by examiner

*Primary Examiner*—Leonidas Boutsikaris

(57) ABSTRACT

An optical system for reforming a laser beam with azimuthal polarization having X and Y components into a beam with linear polarization has a multiplicity of optical elements, at least one of which has a mirror having an absorbing thin film reflective coating to remove the Y-component of the azimuthal beam polarization, thereby reflecting only the X or linear component as a linearly polarized beam. The absorbing thin film reflective coating is comprised of a plurality of layers alternately having high and low indices of refraction. The optical elements include a spatial filter and the beam is passed through the spatial filter to adjust the beam quality. At least one other optical element is collimating and the beam with adjusted beam quality is transmitted to the collimating element to effect its collimation. The collimated linearly polarized laser beam may thereafter be passed through a phase shifter to convert the polarization of the laser beam from linear to circular.

11 Claims, 6 Drawing Sheets

BEAM FORMING TELESCOPE WITH POLARIZATION CORRECTION

BACKGROUND OF THE INVENTION

The present invention relates to an optical system for reforming of a laser beam having azimuthal polarization.

As is well known, the polarization characteristics of a laser beam have a significant effect upon its ability to process materials. For a laser cutting operation, a beam with circular polarization is highly desirable because it eliminates problems of quality in changes in direction and enables the maintenance of quality and essentially constant speed in the movement of the beam relative to the workpiece.

Most commercially available lasers generate a beam with linear polarization, and a phase shifter will convert the linear polarization to circular polarization. The phase shifter retards by 90° the polarization perpendicular to the plane of incidence which is defined by the incident and reflected beam relative to the parallel polarization.

However, stable-unstable laser resonators such as the Helix-Konus resonator described in European Patent 911,922 emit a laser beam in the shape of a segment of a ring as shown in FIG. 1, and the radiation exhibits polarization vectors which can be described as tangents to a circle or azimuthal. These vectors must be converted to linear for conversion of the beam to one with circular polarization.

Previously, it has been proposed to use specially configured optical elements to reform the laser beam in German Offenlegungsschrift DE 4421 600 A1, filed Jan. 2, 1994. Although this technique effects the reforming of the beam to one with linear polarization, the optics require a very high degree of precision and alignment and, accordingly, are costly.

It is an object of the present invention to provide a novel optical system for reforming a laser beam with azimuthal polarization to one with linear polarization.

It is also an object to provide such an optical system which is readily fabricated and easy to assemble.

Another object is to provide a novel method for reforming a laser beam from one with azimuthal polarization to one with linear polarization

SUMMARY OF THE INVENTION

It has now been found that the foregoing and related items may be readily attained in an optical system for reforming a laser beam with azimuthal polarization having X and Y components into a beam with linear polarization comprising a multiplicity of cooperating optical elements, one of the elements being a mirror having an absorbing thin film reflective coating to remove the Y-component of the azimuthal polarization, thereby reflecting only the X or linear component as a linearly polarized beam.

Preferably, the absorbing thin film reflective coating is comprised of a plurality of layers alternately having high and low indices of refraction, and preferably 3–6 layers.

Generally, the optical elements include a spatial filter and the beam reflected by the coated mirror is passed through the spatial filter to adjust the beam quality, or the beam may be passed through the spatial filter before it impinges on the coated mirror. At least one other optical element is collimating and the beam with adjusted beam quality is transmitted to the collimating element to effect its collimation as a linearly polarized beam.

In the method for reforming the laser beam with azimuthal polarization, the laser generates a laser beam with azimuthal polarization having X and Y components. This beam is passed through an optical system with multiple cooperating optical components including a mirror having an absorbing thin film reflective coating to remove the Y component of the beam polarization and thereby reflect only the linearly polarized component. The linearly polarized laser beam is passed through a spatial filter to adjust the beam quality either before or after the coated mirror, and the laser beam is passed to other optical elements to effect its collimation.

Generally, after collimation, the linearly polarized laser beam is thereafter passed through a phase shifter to convert the polarization of the laser beam from linear to circular.

BRIEF DESCRIPTION OF ATTACHED DRAWINGS

DETAILED DESCRIPTION OF THE PREFERRED EMBODIMENT

Figure 1:
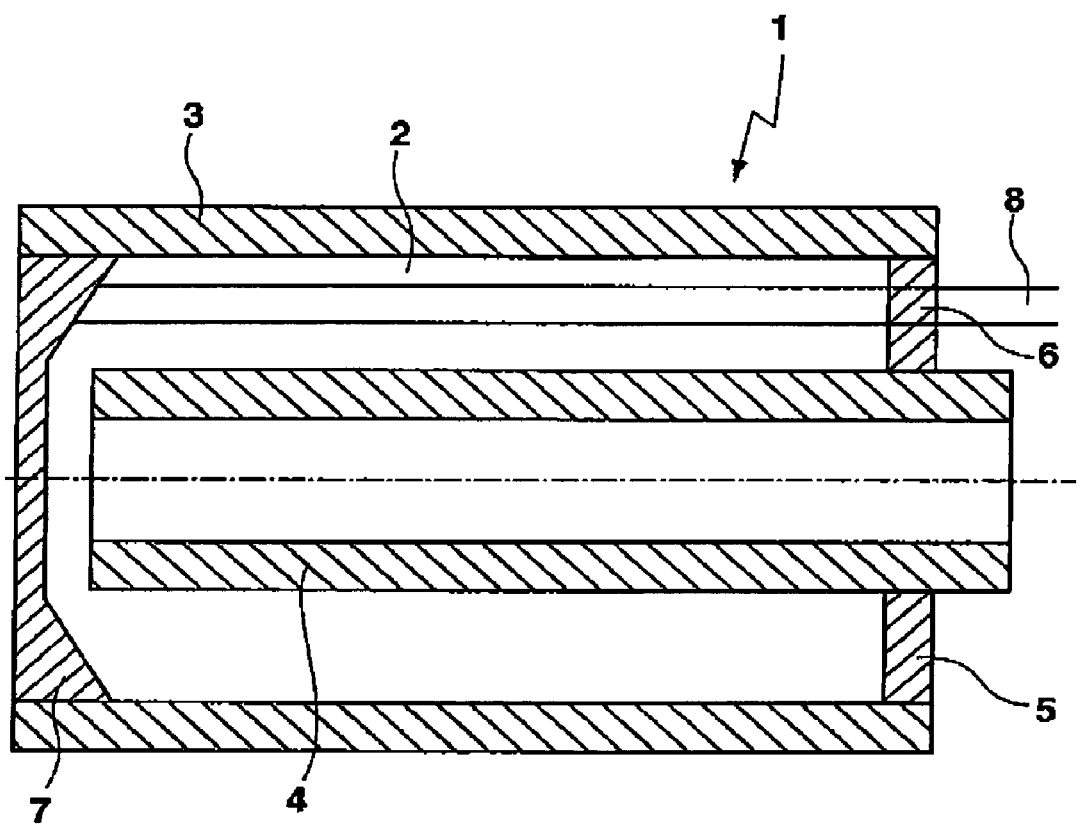
FIG. 1 is a diagrammatic sectional view of a coaxial laser resonator.

FIG. 1 shows a coaxial laser resonator 1 with an annular discharge chamber 2 having a cylindrical outer electrode 3 and a coaxial cylindrical inner electrode 4. At the right end of the laser resonator 1, the ring-shaped or annular discharge chamber 2 is closed by a circular front mirror 5 with a circular sector-shaped output opening 6, and at the left end by a conical retromirror 7.

Figure 2:
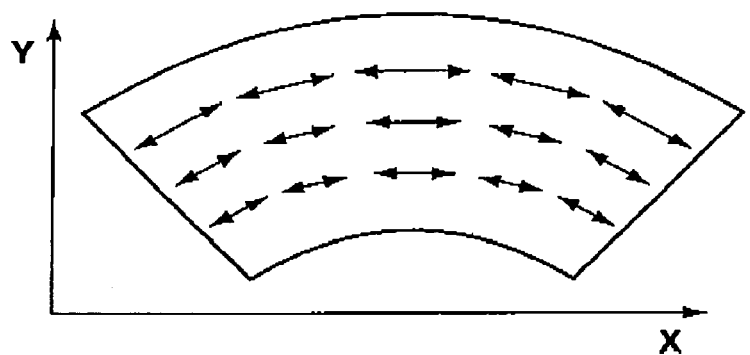
FIG. 2 is a diagrammatic illustration of the radiation emitted by the resonator of FIG. 1.

The laser beam 8 that exits from the annular discharge chamber 2 through the output opening 6 is azimuthally polarized as indicated in FIG. 2, and the power density distribution includes undesirable diffraction components (second maxima). The polarization vectors illustrated in FIG. 2 are generally considered to be tangent to a circle and the polarization is referred to as azimuthal.

Figure 3:
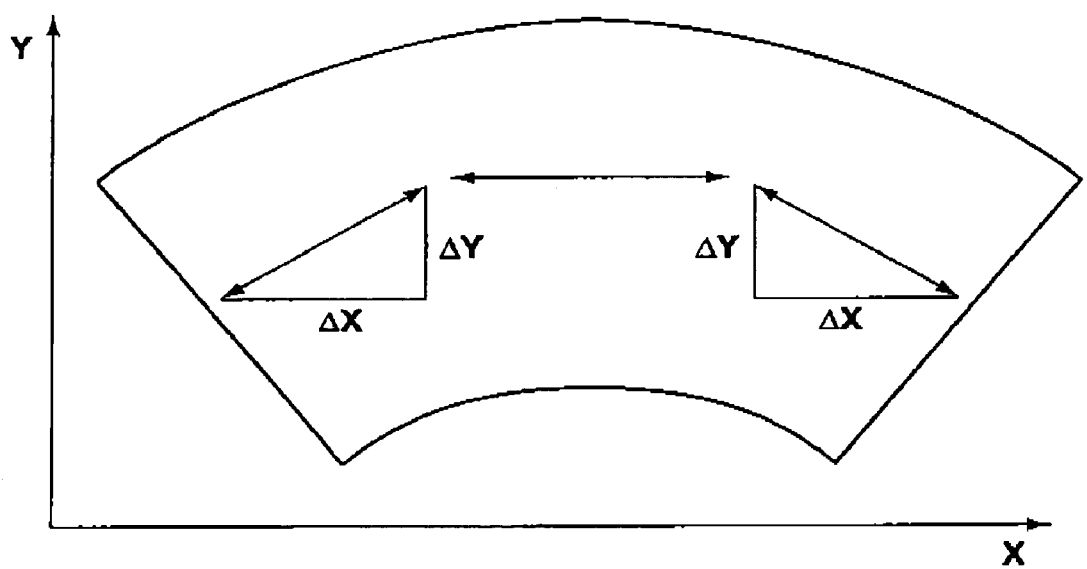
FIG. 3 is a diagrammatic illustration of the X and Y components of the radiation polarization vectors in the radiation of FIG. 1.

As seen in FIG. 3, the polarization vectors can be separated into X and Y components in an X, Y cartesian coordinate system.

As is known polarization vectors can be resolved into components which are parallel (denoted ∥), and perpendicular (denoted ⊥) to the plane of incidence which is defined by the incident and reflective beams. In a coaxial laser of the type shown in FIG. 1, the radiation is in a relatively small ring segment, and approximately 95 percent of the polarization is in the X direction and approximately 5 percent is in the Y direction.

It has herefore been known that dielectric coatings applied to optical components can absorb or deflecting components of a laser beam. This principle has been utilized to protect the optics of a cutting head and a beam delivery system from possible deleterious effects of laser radiation being reflected back into the laser cutting head and beam guide system.

Figure 4:
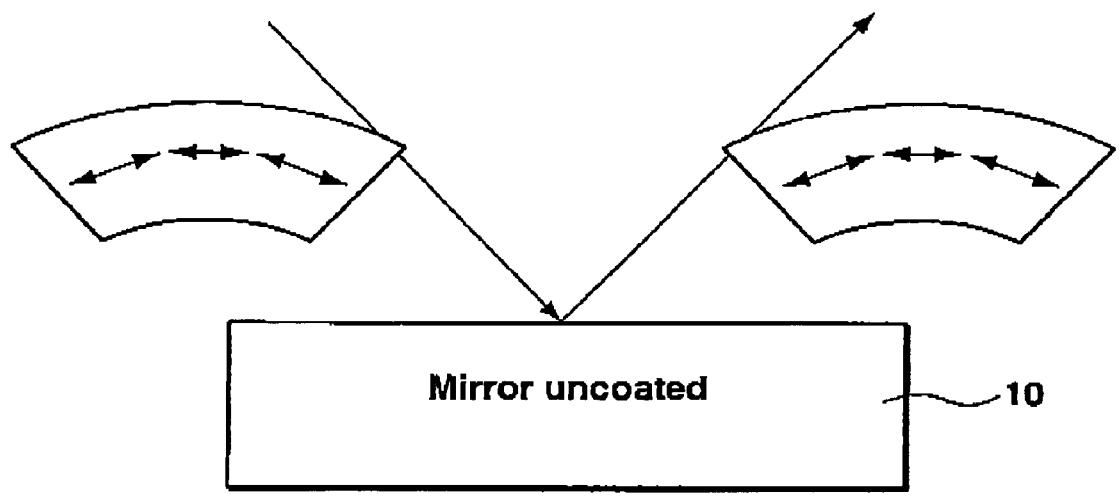
FIG. 4 is a diagrammatic illustration of the reflection of the entire beam by an uncoated mirror.
Figure 5:
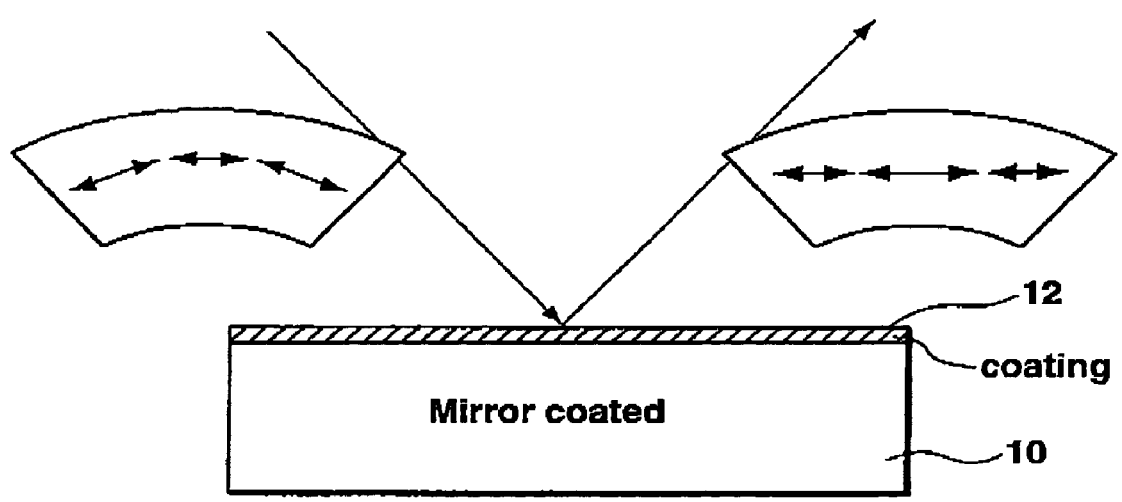
FIG. 5 is a diagrammatic illustration of the effect of coated mirror in absorbing the Y component of the polarization.
Figure 6:
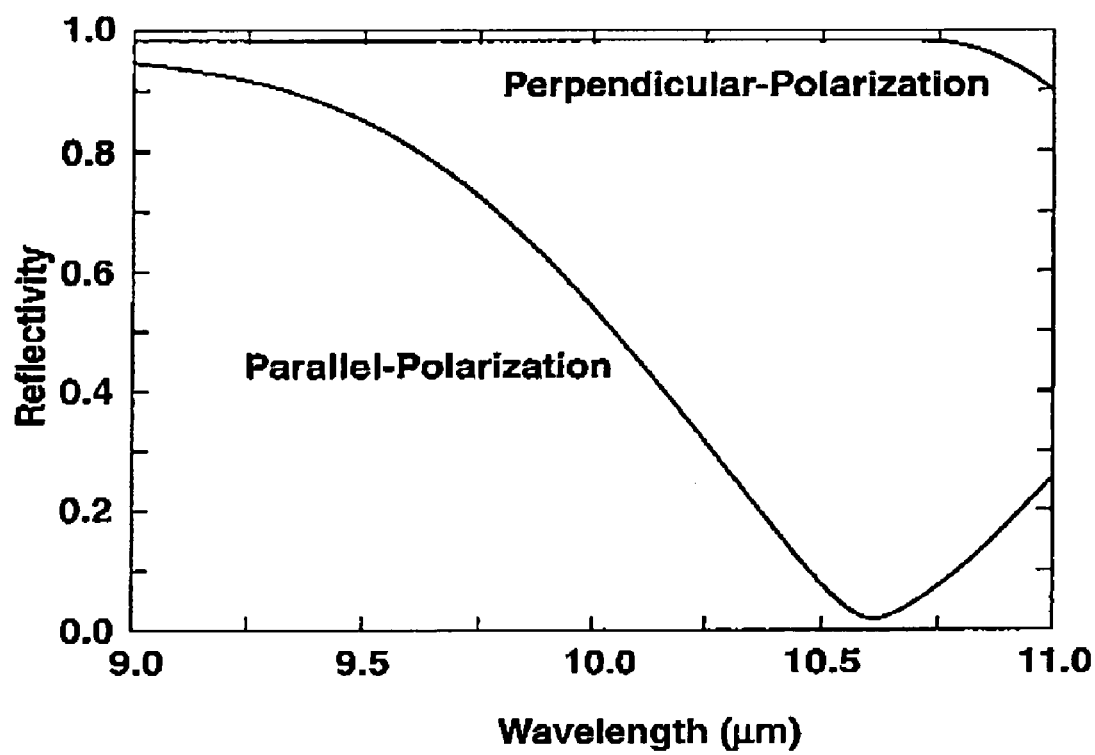
FIG. 6 is a graphic representation of the effect of the coating on the X and Y components of the polarization.

In the present invention, there is provided a system of optical components to modify the laser beam exiting the laser resonator 1, and one of those components is a mirror having an absorbing thin film reflector coating of a dielectric material which will absorb the parallel polarization and reflect the perpendicular polarization. Thus forwarding to the remainder of the optical system a beam which has been converted from azimuthal polarization to one with linear polarization. This is diagrammatically illustrated in FIGS. 4 and 5. In FIG. 4 the uncoated mirror 10 has the normal high reflectivity and it simply deflects the beam at a 90 degree angle without any effect upon the state of polarization which remains azimuthal. In FIG. 5, the dielectric coating 12 on the mirror absorbs or deflects the unwanted parallel polarization component and reflects only the perpendicular polarization component.

The absorbing thin film reflective (ATFR) coating generally contains one or more of the following compounds:

$ThF_4$
$ZnSe$
$Al_2O_3$
$CeF_3$
$SiO_x$

These coatings are generally comprised of several layers of alternating composition, one of which has a high index of refraction and the other of which has a low index of refraction. Generally the coating has 3–6 layers and the thickness is $\lambda/2$ or $\lambda/4$.

Exemplary of a material which has proven highly effective is that applied to mirrors by II–VI Incorporated of Saxonburg, Pa.

Figure 7:
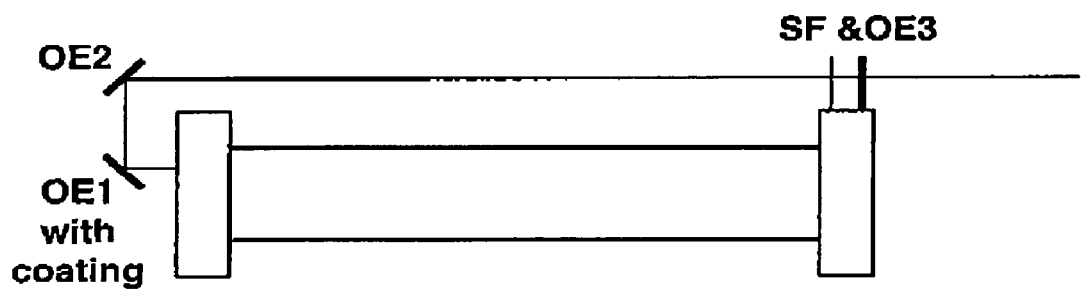
FIG. 7 is a side elevational schematic illustration of an optical system embodying the present invention and the beam trace.
Figure 8:
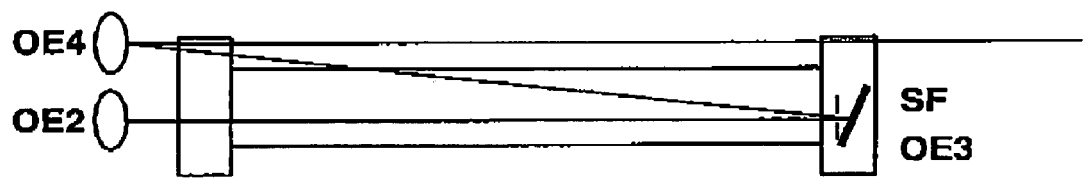
FIG. 8 is a top view thereof.
Figure 9A:
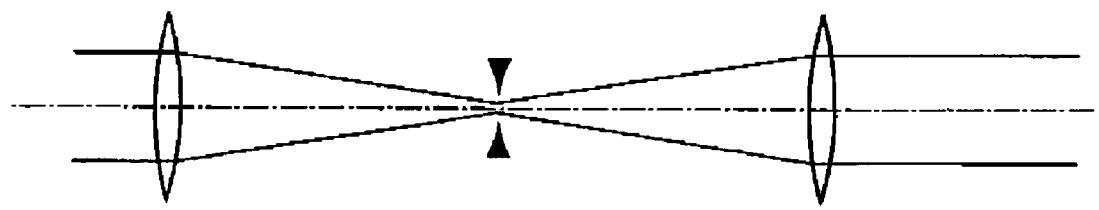
FIG. 9a is a diagrammatic view showing passage of the beam through a spatial filter to improve the quality of the beam.
Figure 10A:
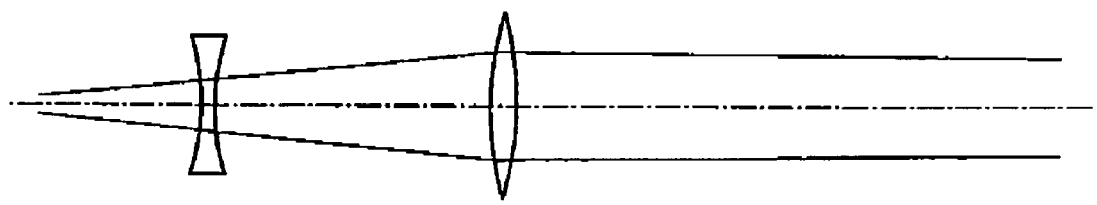
FIG. 10a is a diagrammatic view of optics for collimating the linearly polarized beam.

Turning now to FIGS. 7 and 8, therein illustrated are the elements of an optical system embodying the present invention. mirror OE1 has an ATFR coating so that the beam 10 exiting the laser resonator is reflected thereby and the Y component is filtered out from the beam which is then reflected by mirror OE2. The beam passes through the spatial filter SF and impinges upon the mirror OE3. The beam is then reflected by the mirror OE4 which effects its collimation as is diagrammatically illustrated in FIGS. 9a and 10a.

Figure 9B:
FIG. 9b is a diagrammatic illustration of the intensity of the beam across its width prior to its passage through the spatial filter.
Figure 10B:
FIG. 10b is a diagrammatic illustration of the intensity of the beam after passage through the spatial filter.

Seen in FIGS. 9b and 10b are the cross sections of beam intensity, respectively before passing through the spatial filter and after passing through the spatial filter. As can be seen, the spatial filter significantly enhances beam quality by removing secondary lobes.

As will be readily apparent to those having ordinary skill in the art, various optical elements can be utilized for this purpose. Two optical elements cooperate by forming a telescope to adjust the beam diameter and divergence in the radial and azimuthal direction, and a spatial filter placed in the focus of the telescope will work in the azimuthal direction to enhance the beam quality by clipping off the side lobes which separate from the main peak at the focus. The spatial filter may be placed before or after the ATFR coated mirror.

As a result, the beam leaving the reforming system will be a collimated beam having Gaussian-like intensity distribution and which is linearly polarized.

The linear polarized beam may now be converted into a circularly polarized beam in a conventional fashion by utilizing a phase shifter.

Thus, it can be seen from the foregoing detailed description and the attached drawings that the optical system of the present invention allows reformation of a beam with azimuthal polarization into one with linear polarization which can be subsequently converted to circular polarization by a phase shifter so as to provide an optimum beam for laser cutting or like operations.

The method utilizes components which can be simply and relatively economically fabricated to provide a relatively long lived assembly.

The invention claimed is:

1. In combination with a laser resonator outputting a laser beam in the form of a segment of a ring and having azimuthal polarization with X and Y components, an optical system external to said laser resonator for reforming the laser beam into a beam with linear polarization comprising a multiplicity of optical elements external to the laser resonator and including elements which shape the divergence and diameter of the beam in the radial direction of the laser beam and elements which shape the divergence and beam diameter in the azimuthal direction of the laser beam, at least one of said elements being a mirror having an absorbing thin film reflective coating to remove the Y-component of the azimuthally polarized beam impinging thereon, thereby reflecting only the X component as a linearly polarized beam.

2. The optical system in accord with claim 1 wherein said absorbing thin film reflective coating is comprised of a plurality of layers alternately having high and low indices of refraction.

3. The optical system in accordance with claim 2 wherein each of said layers of thickness has a thickness selected from the group of $\lambda/2$ or $\lambda/4$ of the wavelength of radiation.

4. The optical system in accordance with claim 2 wherein said coating has 3–6 layers.

5. The optical system in accordance with claim 1 wherein said optical elements include a spatial filter through which said beam is passed to adjust the beam quality.

6. The optical system in accordance with claim 5 wherein at least one other optical element is collimating and said beam with adjusted bean quality is transmitted to said collimating element to effect its collimation.

7. A method for reforming a laser beam with azimuthal polarization having X and Y components comprising:
  (a) providing a laser resonator;
  (b) generating a laser beam in a laser medium in said resonator and outputting from said resonator a laser beam in the form of a segment of a ring with azimuthal polarization having X and Y components;
  (c) passing said beam through an optical system with multiple optical components including elements which shape the divergence and diameter of the beam in the radial direction of the laser beam and elements which shape the divergence and beam diameter in the azimuthal direction of the laser beam, at least one of said elements being a mirror having an absorbing thin film reflective coating to remove the Y component of the azimuthally polarized beam impinging thereon and thereby reflect only the X-component as a linearly polarized beam;

(d) passing said laser beam through a spatial filter to adjust beam quality; and (e) thereafter passing said laser beam to other optical elements to effect its collimation.

8. The laser beam reforming method in accordance with claim 7 wherein said absorbing thin film reflective coating is comprised of a plurality of layers alternately having high and low indices of refraction.

9. The laser beam reforming method in accordance with claim 8 wherein each of said layers of thickness has a thickness selected from the group of $\lambda/2$ or $\lambda/4$ of the wavelength of radiation.

10. The optical system in accordance with claim 8 wherein said coating has 3–6 layers.

11. The optical system in accordance with claim 7 wherein said linearly polarized laser beam is thereafter passed through a phase stiller to convert the polarization of said laser beam from linear to circular.

* * * * *